L. AVISUS.
PIANO ACTION.
APPLICATION FILED MAY 1, 1909.
973,841.
Patented Oct. 25, 1910.
2 SHEETS—SHEET 1.
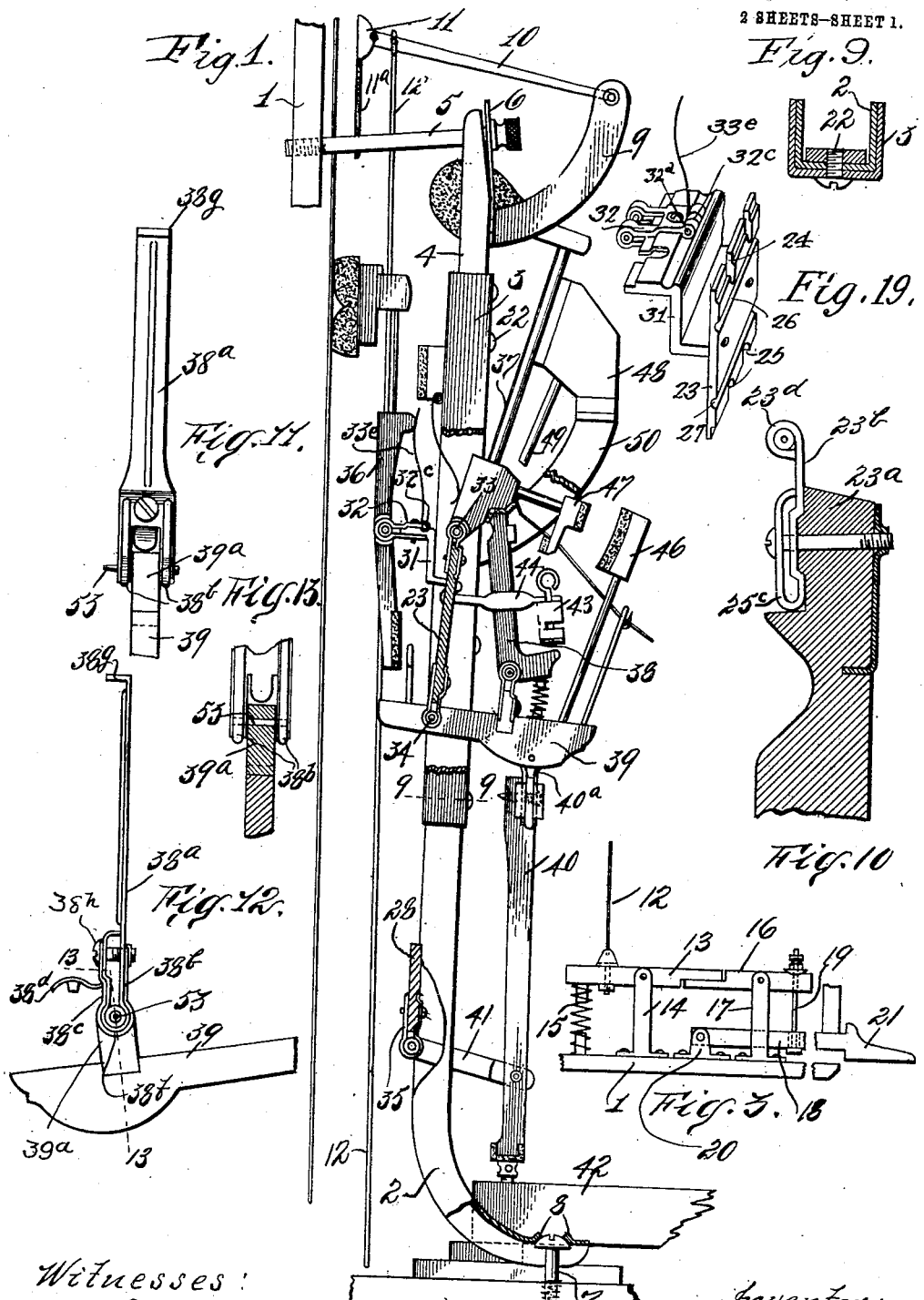
Witnesses:
C. A. Jarvis.
Beatrice Mims
Inventor:
Leopold Avisus
by Emerson R. Newell
Attorney L. AVISUS.
PIANO ACTION.
APPLICATION FILED MAY 1, 1909.
973,841.
Patented Oct. 25, 1910.
2 SHEETS—SHEET 2.
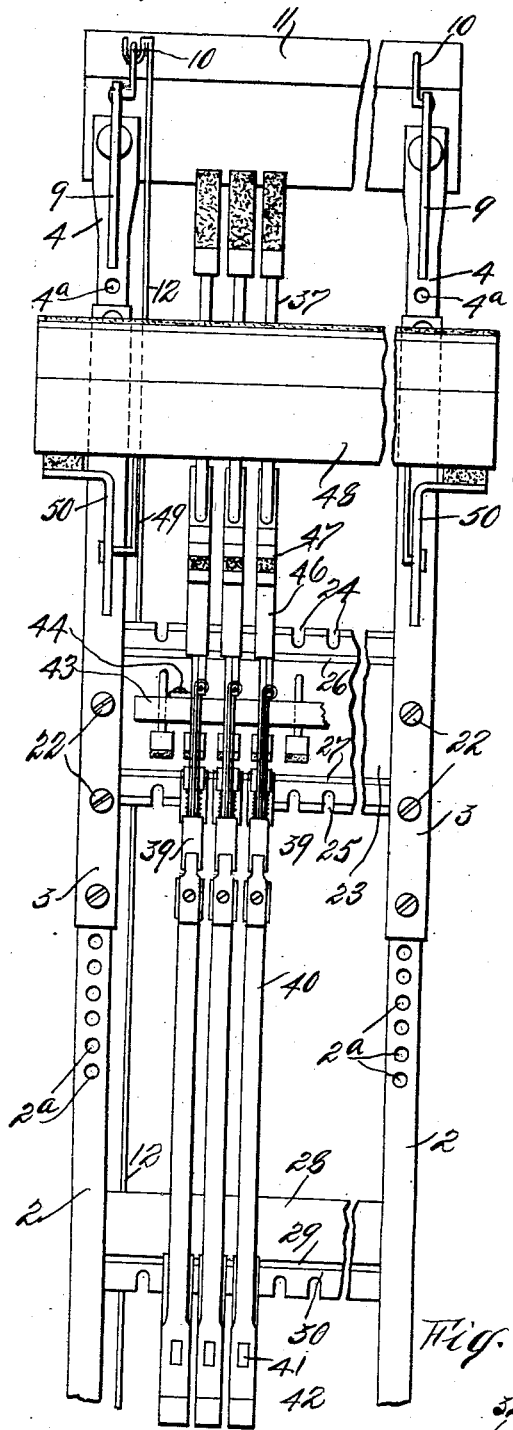
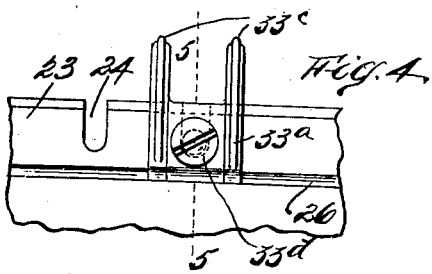
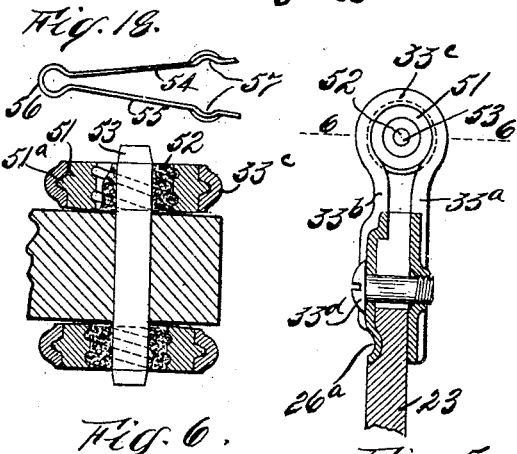
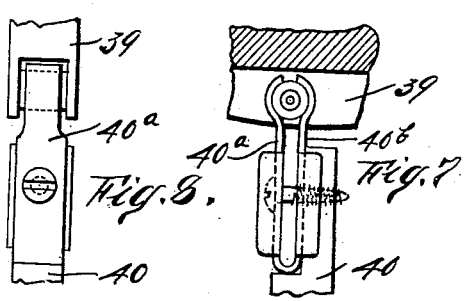
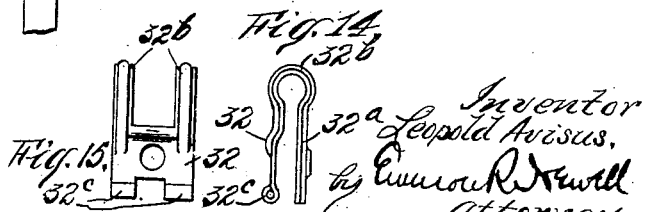

UNITED STATES PATENT OFFICE.

LEOPOLD AVISUS, OF CHICAGO, ILLINOIS.

PIANO-ACTION.

973,841.  Specification of Letters Patent.  Patented Oct. 25, 1910.

Application filed May 1, 1909. Serial No. 493,254.

*To all whom it may concern:*

Be it known that I, LEOPOLD AVISUS, a citizen of the United States, residing at Chicago, Illinois, have invented certain new and useful Improvements in Piano-Actions, of which the following is a clear, full, and exact description.

My invention relates to piano forte actions and to various improvements in the different parts of the same, and relates more particularly to an improved pivot bearing between the several movable parts of said action and one which will show many advantages over the bearings now in use.

Hertofore it has been common in piano actions to pivot one part upon another by means of a pin fixed to one part and adapted to turn within a bushing of felt or lining of soft material, said felt being retained in a recess bored in the wood of the other movable part. This felt bushing thus held in its wooden socket by glue or otherwise provides a good enough bearing under ordinary conditions, but is seriously affected by weather changes since the wood surrounding it contracts and expands to quite a perceptible degree under the influence of moisture. Such expansion results in a very tight bearing in which the pin turns with difficulty, and the retraction causes a loose bearing in which the pin wabbles, and it is to obviate both of these effects that the present pivot bearing is more particularly designed.

My invention also embraces improved supporting devices for these pivot bearings.

My pivot bearing comprises broadly a metallic bushing within which the felt lining is held, so that it is not affected by dampness or other weather changes. The pin fixed to the other movable part turns within this felt lining, and since the lining is preferably retained within the bushing by other means than glue, it does not wear upon the pin in an uneven manner. The metal bushing is held by a metal holder of any preferable design, and this holder corresponding to a flange in the art is adapted to be secured by suitable means upon a support.

I am aware of several patents to F. C. Billings, viz., #713,944; 770,889; 740,796; 810,701, which show a metal flange, but these flanges are not the same as in the present device for the reason that they are adapted to fixedly hold the pivot pin, and the pin is arranged to turn within a felt lining held in a wooden socket. The felt bushing thus being mounted in wood is open to all the defects of previous bearings above referred to.

My invention will be more particularly defined in the claims.

In the drawings which show several different preferred forms of my invention, Figure 1 is a side view of the upright supports and action broken away in parts; Fig. 2 is a front elevation of the same; Fig. 3 is a view of the treadle mechanism for operating the muffler; Fig. 4 is a fragmentary view of a flange rail with a flange mounted thereon; Fig. 5 is a section through line 5—5 of Fig. 4; Fig. 6 is a section through line 6—6 of Fig. 5; Figs. 7 and 8 are views looking at different sides of a modified form of flange holder; Fig. 9 is a section of the upright standards through line 9—9 Fig. 1; Fig. 10 shows a modified form of bushing holder as mounted on the wooden flange rail; Fig. 11 is a sheet metal jack adapted to serve as a bushing holder; Fig. 12 is a side view of said jack; Fig. 13 is a section along line 13—13 of Fig. 12; Figs. 14 and 15 are detached views looking at different sides of another preferred form of bushing holder; Figs. 16 and 17 are views looking at different sides of a modified form of a bushing holder adapted to support a bushing at each end; and Fig. 18 is a detached view of said modified form of bushing holder. Fig. 19 is a detail perspective showing the three edges of the flange rail; and the bushing holders which carry the damper springs.

In the drawings, 1 represents the part of the piano body upon which the movement is mounted; 2, 3 and 4 indicate separate sections of the upright extensible standards upon which the flange rails are carried. As shown these sections are U-shaped in cross section and are perforated at their overlapping ends 2ª, 4ª, whereby they may be adjusted upon each other by means of the connecting screw bolts 22. The upper ends of these standards are secured to the piano body by any preferable adjustable means, such as the lag screw bolts 5. A leaf spring 6 is also fixed to the upper end of the standard adapted to engage beneath the head of each lag screw to take up any play which might occur by the loosening of the same. The lower ends of the standards are preferably curved outward as shown in Fig. 1, to form foot extensions. These extensions have preferably countersunk recesses 8 adapted to rest upon adjustable stud screws 7, the latter being mounted on the piano body. The countersunk recesses 8 may be perforated as shown, to give access to the tops of the screw 7 for adjusting the same vertically.

Mounted on the uppermost sections of the standards are outwardly extending brackets 9 for supporting muffler hooks 10 pivoted thereon, which in turn carry the muffler 11. The muffler 11 is moved up and down from its operative to inoperative position by means of the connecting rod 12 and the mechanism shown in Fig. 3. The lower end of the rod 12 is connected to a lever 13 pivoted to a support 14, which in turn is fixed to the piano body 1. One end of the lever 13 is engaged by a spring 15 at its underside to normally keep it raised, and the muffler 11 likewise in its upward position. The other end of the lever 13 is engaged by the end of a second lever 16 pivoted on a support 17 fixed to the piano body. A foot lever 21 is pivoted on a support 20 and is connected to the opposite end of lever 16 by the rod 19. It will be understood that when the lever 21 is depressed by the foot, it acts to depress the rear end of lever 13 against the force of its spring and allow the muffler 11 to drop by its own weight into its operative position in front of the hammers. A felt cloth or some similar substance 11$^a$ hangs from the muffler 11 to come between the hammers and the strings when lowered.

The different parts of the piano action as shown are of the usual type in which the key lever is indicated at 42, engaging the lower end of the sticker 40, said sticker being carried by the tongue 41 and pivotally connected at its upper end to the wippen 39. The wippen is pivotally mounted at the lower edge of the flange rail 23 and has pivoted thereon the jack 38 which engages the butt of the hammer 37.

36 are the damper levers, 46 are the back checks engaging the back stops 47 of the hammers, and 50 are hammer-rail-supporting brackets mounted on the upright standards, the hammer rail 48 being pivotally connected to said brackets 50 by means of supporting hooks 49.

Mounted on the middle sections of the upright standards transversely across the piano body is the flange rail 23 having upper and lower longitudinal edges, and a portion 31 extending rearwardly from the upper edge thereof to form a third longitudinal edge. These upper and lower edges are preferably formed with a series of notches 24, 25. It is plain by Fig. 19 that the extension 31 is also similarly notched along its edge, in the same manner as indicated by the notches 24 in Figs. 2 and 4. Running adjacent the notches 24 is preferably a groove 26, and adjacent the notches 25 is a groove 27 on this flange rail, for a purpose which will be apparent later. Secured to the flange rail at the notches along its upper and lower edges is a series of bushing holders or flanges 33 and 34 respectively, a preferred form of which is shown in Figs. 4, 5 and 6. Fig. 10 shows a modified form of a bushing holder which may be used along the upper and lower edges of a wooden rail.

Referring to my preferred form of flange or bushing holder disclosed in Figs. 4 to 6, it will be seen that this flange consists of a metal plate bent over upon itself to form a bight or socket portion 33$^c$ and two leg portions 33$^a$ and 33$^b$ which are preferably disposed upon opposite sides of the flange rail. The legs are perforated and adapted to receive a connecting screw 33$^d$ which passes through the notch of the rail for drawing the legs tightly together upon the rail. Gripped in the bight portion of the holder is a metal bushing 51 provided with a projection or circular rib 51$^a$ around its outer periphery to fit in a groove formed therefor in the socket of the flange. The inner periphery of the bushing 51 is grooved preferably by forming a screw thread therein and is adapted to retain a lining of felt or other soft material 52 therein. This felt lining forms the bearing for the pivot pin 53 which is fixed to the other movable part, in this case the hammer butt. It will be observed that the bushing holder has a portion of the metal bent (in the present case shown by the rib 33$^c$ in Fig. 6) so as to prevent the lateral removal or loss of the bushing from the holder. It will also be observed that one leg, such as 33$^b$, has a depressed portion at its outer end at 26$^a$ for engaging the groove 26 of the flange rail to more accurately secure it in position.

A lower flange rail 28 mounted on the lowermost sections of the standards carries along its lower edge a series of bushing holders or flanges 35 which are similar in every respect to those just described.

The series of bushing holders 32 mounted on the edge 31 have an additional feature to the above described bushing holders shown more clearly in Figs. 14 and 15. The rear upper edge of this bushing holder 32 is notched to form two ears 32$^c$ which are rolled up upon themselves to form oppositely alined bearings. A transverse pin 32$^d$ is carried in these bearings which is adapted to receive the coil of the damper spring 33$^e$. These bearings 32$^c$ also form the engaging portion for this flange corresponding to the portion 26 for engaging the groove along the edge 31 of the flange rail.

Although I have particularly described bushing holders or flanges adapted to be mounted on the flange rails, it will be understood that the pivot bearings between other parts of the action may be similarly constructed, for example that between the sticker 40 and the wippen 39, which bushing holder is shown more clearly in Figs. 7 and 8. In this case the holder is formed of a piece of metal bent upon itself to form legs 40ª, 40ᵇ, but grips the metal bushing not at its bight but between its free ends which are curved suitably for forming a socket therefor.

In some cases it may not be desirable to have a flange rail with two upper longitudinal edges, and in this case a double bushing holder may be used such as disclosed in Figs. 16 to 18 inclusive. This bushing holder is likewise formed by bending a plate of metal upon itself to form a socket at its bight portion 56, and also having a socket formed by its free end portions 57. The intermediate portions 54 are secured together and to the upper edge of the flange rail by screws 58 and 59. It is understood, when this form of flange is used, that one end grips the bushing and bearing in which the hammer is pivoted and the other end the bushing and bearing in which the damper lever is pivoted.

I have also shown in Figs. 11, 12 and 13 a modified form of a jack 38ª combined with a bushing holder having the general characteristics of the flanges above described which may be substituted in place of the ordinary wooden jack. This jack is formed of sheet metal having its upper end 38ᵍ bent at an angle to form a hammer butt engaging corner and having its lower end bent over upon itself to form a bushing holder. A portion 38ᵈ is cut out of its bent-over portion and is bent outwardly as shown to form the foot for engaging the jack spring. This cut-out portion leaves two oppositely alined sockets 38ᶠ at the bight of the bent-over portion, which serve to hold the bushings. The sides 38ᶜ and 38ᵇ of the bent-over portion are drawn together by a suitable screw 38ʰ to tightly grip the bushing in the socket. When this form of metal jack and bushing holder is used, it is understood that a bearing pin 53 is fixedly carried in wooden lug 39ª of the wippen 39 and its ends turn in the felt lining of the bushings held in sockets 38ᶠ.

What I claim is:—

1. In a piano action in combination, a pivot bearing between two parts, comprising a pivot pin fixed to one of said parts, a bearing attached to the other part comprising a metal bushing having a lining of soft material in which said pin is located, and a metal bushing-holder for gripping tightly said bushing.

2. In a piano action in combination, a pivot bearing between two parts, comprising a pivot pin fixed to one of said parts, a bearing attached to the other part comprising a metal bushing having a lining of soft material in which said pin is located, and a bushing-holder formed of a single piece of spring metal bent over upon itself and gripping said bushing at its bight.

3. In a piano action in combination, a pivot bearing between two parts, comprising a pivot pin fixed to one of said parts, a bearing attached to the other part comprising a metal bushing having a lining of soft material in which said pin is located, and a bushing-holder formed of a single piece of spring metal bent over upon itself to form two legs, and gripping said bushing at its bight, and a screw connecting said legs.

4. A bushing holder comprising a spring-metal plate bent over upon itself to form two legs having a tendency to spring apart, a metal bushing held by said holder, and a lining of soft material in said bushing, and a screw for drawing said legs together.

5. In a piano action in combination, a flange rail, a pivot flange comprising a spring metal plate bent over upon itself to form legs disposed on opposite sides of said rail, and a screw passing through said legs to clasp the same upon said rail.

6. In a piano action in combination, a flange rail provided with a notch at its edge, a flange comprising a spring metal plate bent over upon itself to form legs disposed on opposite sides of said rail over said notch, and a screw passing through said legs and located in said notch to clasp said legs on said rail.

7. In a piano action in combination, a flange rail provided with a notch at its edge, a flange comprising a spring metal plate bent over upon itself to form legs disposed on opposite sides of said rail over said notch, and a screw passing through said legs and located in said notch to clasp said legs on said rail, the metal of said flange plate having a spring action to spring said legs apart when said screw is loosened sufficiently, to allow the flange and screw to be removed together.

8. In a piano action in combination, a flange rail provided with a groove along the same, a flange comprising a spring metal plate bent over upon itself to form legs disposed on opposite sides of said rail, and a lateral portion to engage said groove, and a screw passing through the said legs and located in said notch to clasp said legs upon the rail, the metal of said flange plate having a spring action to spring said legs apart, when said screw is loosened sufficiently, to allow the flange and screw to be removed together.

9. A bushing holder provided with a grooved seat portion and an attaching extension, a metal bushing carried in said seat portion provided with an interior lining of soft material and having a projection on its outer periphery for fitting in said groove.

10. A bushing holder provided with a grooved seat portion and an attaching extension, a metal bushing carried in said seat portion provided with an interior lining of soft material and having a projection on its outer periphery for fitting in said groove, and also having a grooved inner periphery for retaining said lining therein.

11. In a piano action in combination, a flange rail of sheet metal having a series of notches along its edge, a series of flanges secured to said rail at said notches, each of said flanges consisting of a piece of metal bent over upon itself to form a bight portion and separated legs disposed on opposite sides of said flange rail, said legs being perforated to receive a connecting screw, said screw passing through said notch for clasping said legs upon said rail.

12. A flange for piano actions, comprising a piece of spring metal bent over upon itself to form a bight portion with separated legs, one of said legs being notched at its edge, the separate ears thus formed being rolled over to provide oppositely alined bearings, a transverse pin carried in said bearings adapted to receive intermediate its ends a coil of a spring.

13. A flange for piano actions, comprising a piece of spring metal bent over upon itself to form a bight portion with separated legs, a metal bushing carried in said bight portion and an interior lining of soft material for said bushing, one of said legs being notched at its edge, the separate ears thus formed being rolled over to provide oppositely alined bearing, and a transverse pin carried in said bearings adapted to receive intermediate its ends a coil of a spring.

14. In a piano action in combination, a sheet-metal action rail having three edges, and three series of flanges therefor, each series fastened to said rail at one of its edges, each flange comprising a spring metal plate bent over upon itself to form legs located on opposite sides of said rail and a screw passing through said legs to draw them together against said rail.

15. In a piano action in combination, a sheet-metal action rail having three edges, notches formed in said edges, and three series of flanges therefor, each series being fastened to said rail at one of its edges, each flange comprising a spring metal plate bent over upon itself to form legs located on opposite sides of said rail at one of said notches and a screw passing through said legs and located in said notches to draw said legs together against said rail.

16. In a piano action in combination, a sheet-metal action rail having three edges, notches formed in said edges, and three series of flanges therefor, each series being fastened to said rail at one of its edges, each flange comprising a spring metal plate bent over upon itself to form a bight and two legs located on opposite sides of said rail and a screw passing through said legs to draw them together against said rail, and metal bushings clasped in the bights of said flanges having an interior lining of soft material.

17. A flange comprising a metal bushing having a lining of soft fibrous material and a pivot pin located therein, a bushing holder comprising a strip of spring metal bent around said bushing to form a socket and holding the bushing by the spring of the metal, means for preventing lateral removal of said bushing, and a support for said flange, a screw attaching said flange to said support, said screw and flange being provided with means whereby, when said screw is loosened, said flange and screw may be detached together from said support while said screw is still retained by said flange.

18. A flange comprising a pair of metal bushings each of which has a lining of soft fibrous material, a pivot pin located therein, a bushing holder comprising a strip of spring metal bent around said bushings to form a socket at each side of said holder and holding the bushings by the spring of the metal, means for preventing lateral removal of said bushings, and a support for said flange, a screw attaching said flange to said support, said screw and flange being provided with means whereby, when said screw is loosened, said flange and screw may be detached together from said support while said screw is still retained by said flange.

19. A flange between two relatively movable parts comprising a pivot pin carried by one of said parts, a metal bushing having a lining of soft fibrous material within which said pin is located, and a bushing holder formed out of sheet metal bent around said bushing into a socket and holding the same, a portion of the metal of said holder being bent so as to prevent the lateral removal of said bushing.

20. A flange between two relatively movable parts comprising a pivot pin carried by one of said parts, a metal bushing having a lining of soft fibrous material within which said pin is located, and a bushing holder formed out of spring sheet metal bent around said bushing into a socket and holding the same and extending beyond said socket into two separated legs, a portion of the metal of said holder being bent so as to prevent the lateral removal of said bushing, and a screw passing through said legs to draw them together.

21. A flange between two relatively movable parts comprising a pivot pin carried by one of said parts, a metal bushing roughened on its inner surface and having a lining of soft fibrous material within which said pin is located, and a bushing holder formed out of spring sheet metal bent around said bushing into a socket and holding the same and extending beyond said socket into two separated legs, a portion of the metal of said holder being bent so as to prevent the lateral removal of said bushing, and a screw passing through said legs to draw them together.

22. A flange between two relatively movable parts comprising a pivot pin carried by one of said parts, a metal bushing having a lining of soft fibrous material within which said pin is located, and a bushing-holder formed out of sheet metal bent around said bushing into a socket and holding the same, said metal bushing having a lateral projection and said socket a co-acting part, and the two together preventing the removal of said bushing from said socket.

23. In a piano action, a pivot-bearing between two relatively movable parts comprising a pivot pin carried by one part, a substantially unyielding metal bushing having a lining of soft material, a bushing-holder carried by the other part and formed out of a strip of spring metal bent over upon itself to form a socket within which said bushing is located, and two legs beyond said socket and a screw passing through said legs and operating to draw said legs toward each other, said socket being of such a size that when said screw is entirely removed said bushing will still be retained in said socket.

24. In a piano action, a pivot-bearing between two relatively movable parts comprising a pivot-pin carried by one part, a substantially unyielding metal bushing having a lining of soft material, a bushing-holder carried by the other part and formed out of the strip spring metal bent over upon itself to form a socket within which said bushing is located, and two legs beyond said socket and a screw passing through one leg and having a head resting against said leg, said other leg having a threaded hole therein in which said screw meshes to draw said legs toward each other.

Signed at New York, N. Y. this 27th day of April 1909.

LEOPOLD AVISUS.

Witnesses:
    EMERSON R. NEWELL,
    BEATRICE MIRVIS.